US005340139A

United States Patent [19]

Davis

[11] Patent Number: 5,340,139

[45] Date of Patent: Aug. 23, 1994

[54] AMBULATORY WHEELSTAND WITH TORSO AND LEG SUPPORT

[76] Inventor: Daniel W. Davis, 1367 Merle Ave., Burton, Mich. 48509

[21] Appl. No.: 2,146

[22] Filed: Jan. 11, 1993

[51] Int. Cl.[5] .......... B62H 1/00

[52] U.S. Cl. .......... 280/304.1; 280/250.1; 297/5; 297/DIG. 10

[58] Field of Search .......... 280/304.1, 290, 250.1; 297/5, DIG. 4, DIG. 10; 135/67

[56] References Cited

U.S. PATENT DOCUMENTS

| | | | |
|---|---|---|---|
| 2,636,188 | 4/1953 | Lockey | 280/250.1 |
| 4,390,076 | 6/1983 | Wier et al. | 280/304.1 |
| 4,620,714 | 11/1986 | Davis | 280/304.1 |
| 4,744,578 | 5/1988 | Sterns | 280/250.1 |
| 4,802,542 | 2/1989 | Houston et al. | 297/DIG. 4 |
| 4,927,167 | 5/1990 | Davis | 280/250.1 |
| 4,968,050 | 11/1990 | Kendrick et al. | 297/DIG. 10 |
| 5,242,180 | 9/1993 | Bergeron | 280/304.1 |

*Primary Examiner*—Margaret A. Focarino
*Assistant Examiner*—Christopher P. Ellis
*Attorney, Agent, or Firm*—Gifford, Groh, Sprinkle, Patmore and Anderson

[57] ABSTRACT

A wheelstand comprises a frame including a pair of lateral supports in spaced, parallel arrangement. A pair of large drive wheels are rotatably secured at the rear ends of the lateral supports and a pair of castor wheels are secured at the front ends of the lateral supports. A user support structure or a prone board comprising a pair of elongated rails, spanned at one end by a chest pad, is pivotably secured to the lateral supports for pivoting between at least an upright or vertical position and a prone or horizontal position. The wheelstand includes a pair of adjustable knee pads and a posterior pelvic stabilizer, or an elongated, curved seat pivotably attached to a bar. A pair of optional thoracic lateral pads extend from the sides of the chest pad to stabilize the trunk laterally and to support the trunk in the mid-line position. Also optionally provided is a posterior thoracic panel for attaching to the lateral pads by a strap and an anterior abdominal pad. At the end of the prone board opposite the chest pad are provided foot plates. In an alternate embodiment of the present invention, the foot plates may be left off, thereby converting the wheelstand into a wheelstand-walker.

15 Claims, 4 Drawing Sheets

AMBULATORY WHEELSTAND WITH TORSO AND LEG SUPPORT

BACKGROUND OF THE INVENTION

I. Field of the Invention

The present invention relates to ambulatory devices for physically handicapped individuals and, in particular, to an ambulatory wheelstand having multiple angular positions in which the center of gravity of the user remains centrally disposed above a particular location on the wheelstand frame. The wheelstand of the present invention includes torso and leg support.

II. Description of the Prior Art

Ambulatory device have been used to enable a non-ambulatory person, such as a paraplegic or a quadriplegic, to move about more or less on his own, Typical wheeelchairs were the first types of ambulatory devices, but required the user to remain in one position, thus causing atrophy of the muscles.

Wheelstands first resembled a cross between a wheelchair and a gurney and employed a foldable or pivotable stretcher portion which could pivot between a horizontal and an upright position. Examples of these earlier wheelstands can be found in U.S. Pat. Nos. 2,295,006 to Philips and 2,986,200 to Nobile. Each of these patents discloses a device having a large central driving wheel rotatably attached to a frame stabilized by castor wheels at the front and the rear of the device. The patient support is pivotably secured to the frame and includes either a straight stretcher or a somewhat chair-shaped platform to support the user. The support is pivotable between an upright position and a horizontal position. Because of the relatively high pivoting point of the support structure of these devices, the center of gravity of the devices is quite high, rendering the device somewhat unstable. The front and rear castor wheels are required to improve stability.

U.S. Pat. No. 4,310,167 to McLaurin discloses what the inventor calls a center of gravity wheelchair with an articulated chassis. This wheelchair also has a large drive wheel centrally located and both front and rear castor wheels. The chassis is articulated so that the user can shift the center of gravity of the device forward by operation of a lever which extends the chassis frame and the front castor wheel, thus elongating the frame and improving the stability. This device is particularly useful for negotiating curbs, hills or the like. However, McLaurin still employs front and rear castors and allows the user to assume a sitting position only.

Two improved ambulatory wheelstands are disclosed in U.S. Pat. Nos. 4,620,714 and 4,927,167, both to Davis. The '714 patent disclosed a wheelstand having a generally rectangular main frame supported on a ground support surface by two relatively large wheels disposed between a pair of relatively small rear wheels and a pair of relatively small front wheels. The '167 patent also discloses a wheelstand having a user support structure pivotably mounted on a frame.

While these early inventions all played a part in improving the conditions of non-ambulatory persons, they have failed to provide for the specific needs of certain afflicted individuals. The wheelstands that comprise the prior art have utility for many physically handicapped persons, but nevertheless fail to provide for the specific needs of certain afflicted individuals. More particularly, the known wheelstands provide only minimal support for individuals suffering from one of the various cerebral palsy syndromes. These individuals require special trunks and leg support. Even more specific needs are had by those persons grouped in the spastic syndrome. These individuals make up about seventy percent of cerebral palsy cases. The spastic patient requires special care because the affected limbs of the patient usually show increased deep tendon reflexes and muscular hypertonicity and a tendency to contractures. The muscles controlling the limbs tend to contract spontaneously, causing spastic torso and limb movements. None of the known wheelstands is capable of responding to these special needs.

SUMMARY OF THE PRESENT INVENTION

These and other disadvantages are overcome by the present invention which discloses an ambulatory wheelstand having special trunk and leg supports necessary to enable individuals afflicted with certain neurological disorders to independently ambulate in the upright position or crawl while lying prone to the floor. The ambulatory wheelstand of the present invention comprises a frame including a pair of lateral supports or rails in spaced, parallel arrangement with front and intermediate cross supports extending between the lateral supports. A pair of large drive wheels are rotatably secured at the rear end of the lateral supports and a pair of castor wheels are secured to the front end of the lateral supports. A user support structure or prone broad comprising a pair of elongated rails spanned at one end by a chest pad is pivotably secured to the lateral supports for pivoting between at least an upright or vertical position and a prone or horizontal position.

The stability of a wheelstand of this type depends on the position of the center of gravity of the device combined with its users. The center of gravity is ideally located as close to the ground as possible and, with respect to the front and rear of the frame, should be located between the drive wheels and the castor wheels, but closer to the drive wheels than to the castor wheels. The center of gravity does not move forward significantly when the user support is shifted from the upright to the prone position. Instead, the center of gravity remains distributed over substantially the same location of the frame regardless of the position of the user support. This is accomplished by sliding the user support structure rearwardly as it is pivoted from the upright to the prone position. An elongated slot is provided for this purpose in each of the lateral supports. Hinge pins secured to the elongated rails of the user support structure are slidably entrained in the slots. A pair of gas cylinders are provided between the prone board and each of the lateral supports. In the upright position of the prone board, the hinge pins are disposed at the forward ends of the elongated slots. As the prone board pivots to the prone position, the hinge pins slide reareardly to the rear ends of the slots and the pivot arms pivot from an upright position to a more rearward, more horizontal position.

An important feature of the present invention lies in its improved system for maintaining spinal alignment, particularly those with a spastic syndrome. In addition to the chest pad, the system comprises a pair of adjustable knee pads and a posterior pelvic stabilizer, or an elongated, curved saddle pivotably attached to a "goose neck" bar. The bar is rigidly attached to the prone board. The stabilizer is movable from a horizontal position that allows the user to mount or dismount the wheelstand to a substantially vertical position in which forward pressure is applied to the back of the pelvis, thereby pressing the user against the chest pad and the knee pads of the prone board.

A pair of optional thoracic lateral pads extend from the sides of the chest pad to stabilizer the trunk laterally and to support the trunk in the midline position. Also optionally provided is a posterior thoracic panel for attachment to the lateral pads by a strap and an anterior abdominal pad. At the end of the prone board opposite the chest pad are provided foot plates. In an alternate embodiment, the foot plates may be left off, thereby converting the wheelstand into a walker having all of the trunk support provided in the preferred embodiment.

The wheelstand of the present invention is suited for children as well as adults.

The primary object of any such user support system is to provide the user with as much support as is necessary but no more, thus encouraging muscular development and independence without compromising support. The wheelstand of the present invention accomplishes this and related objectives by providing a unit that offers a variety of accessories that may be included or excluded depending upon the needs and abilities of the individual user.

The presently-described advantages and features and those to be described below disclose a wheelstand that overcomes the disadvantages of known stands.

BRIEF DESCRIPTION OF THE DRAWINGS

The present invention will be more fully understood by reference to the following detailed descriptions, when read in conjunction with the accompanying drawings in which like reference characters refer to like parts throughout the several views and in which.

DETAILED DESCRIPTION OF THE PREFERRED EMBODIMENTS OF THE PRESENT INVENTION

The drawings disclose the preferred embodiments of the present invention. While the configurations according to the illustrated embodiments are preferred, it is envisioned that alternate configurations of the present invention may be adopted without deviating from the invention as portrayed. The preferred embodiments are discussed hereafter.

Figure 1:
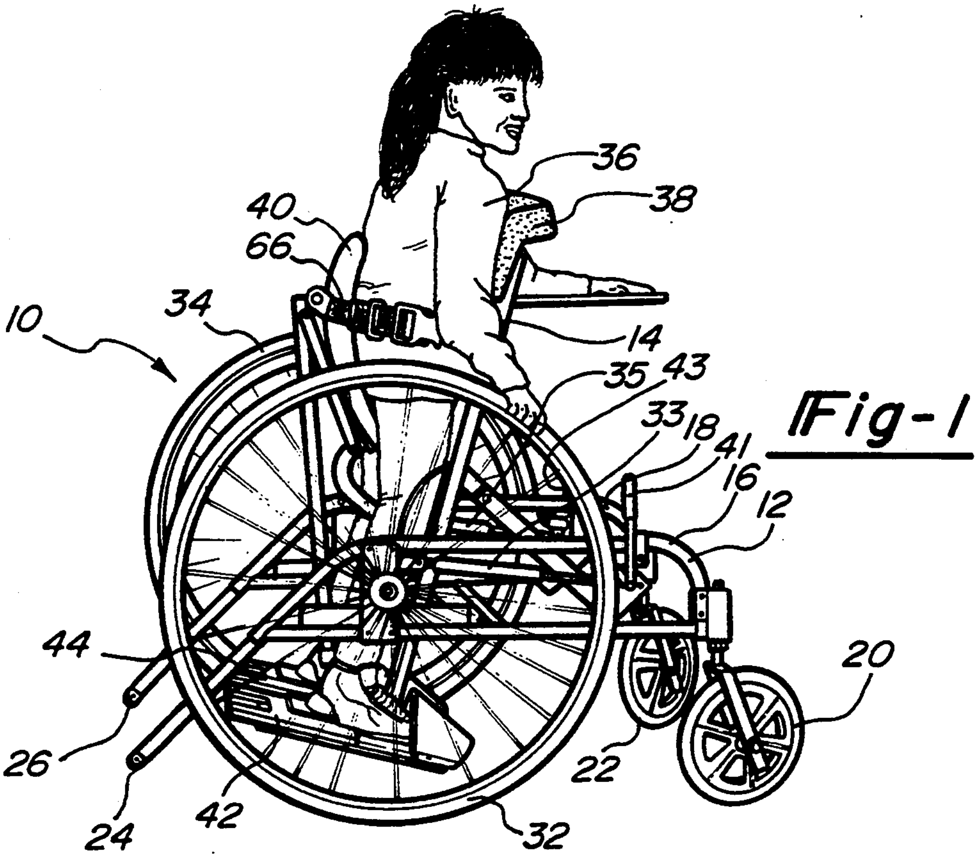
FIG. 1 is a perspective view of the preferred embodiment of a wheelstand according to the present invention as used by a child.

FIG. 1 shows the preferred embodiment of the wheelstand according to the present invention, generally indicated as 10. The wheelstand 10 includes a frame 12 and a prone board 14. The prone board 14 is a standing support frame that can be shifted to lean forward at about seventy-five degrees when vertical and tilts to about zero degrees, or within an arm's reach of the floor, when horizontal. The combination of the frame 12 and the prone board 14 provide a wheelstand 10 that has a high degree of comfort for the user while encouraging substantially one-hundred percent weightbearing on the lower extremities.

The frame 12 is constructed largely from rigid tubes and comprises a pair of spaced apart lateral supports or rails 16, 18 that are in parallel arrangement. At the front end of rail 16 is fitted a swiveling castor wheel 20, and at the front end of rail 18 is fitted a swiveling castor wheel 22. Pivotable mounting of the castor wheels 20, 22 to the wheelstand 10 permits turning of the wheelstand.

At the rear end of each of the rails 16, 18 is fitted antitipper bars 24, 26 respectively. The antititippers 24, 26 prevent the wheelstand 10 from flipping over backwards, a situation which is of concern particularly in the situation of the spastic user who may thrust his arms and head back while his pelvis thrusts forward.

Each rail 16, 18 has rotatably mounted thereon a large diameter drive wheel 32, 34 respectively. The user can reach the wheel 32, 34 while in the upright position. The wheels are preferably lightweight, spoked wheels. Alternatively, the wheels may be disks (not shown) to prevent fingers from being caught, or may be spoked with peripheral finger protection in the form of a cover over the endmost portions of the spokes (also not shown). The castor wheels 20, 22 and the drive wheels 32, 34 are attached to the frame 12 so that the lateral rails 16, 18 are substantially parallel to a ground surface (not shown) which supports the wheels of the wheelstand 10.

Each drive wheel 32, 34 is provided with a brake 41, 43. The brakes may include extension arms (not shown) to allow the user to engage or disengage the brakes at will. The extension arms slip over the handles of the brakes and therefore place the brakes closer to the user. They are recommended for children with limited arm reach or for children requiring accessory thoracic lateral pads (to be discussed below with respect to FIG. 2).

A pair of pressurized gas cylinders 33, 35 are pivotably disposed between the prone board 14 and each of the rails 16, 18. Although only one such cylinder is necessary as a practical matter, the presence of two such cylinders provides an added safety feature as well as providing for steadier vertical-to-horizontal and horizontal-to-vertical movements.

Each major component of the wheelstand 10, that is, the frame 12, the prone board 14, the castor wheels 20, 22, the antitipper bars 24, 26, and the large drive wheels 32, 34, may be easily detached from each other to provide ease of transportation and repair.

A user 36 is in place on the prone board 14 as she would appear when the board 14 is in its upright or vertical position. She faces the general direction of travel. The prone board 14 includes a chest pad 38, the knee pads 50, 52, a posterior pelvic stabilizer assembly 40, and, in the preferred embodiment of the wheelstand 10, a right foot plate 42, and a left foot plate 44.

Figure 2:
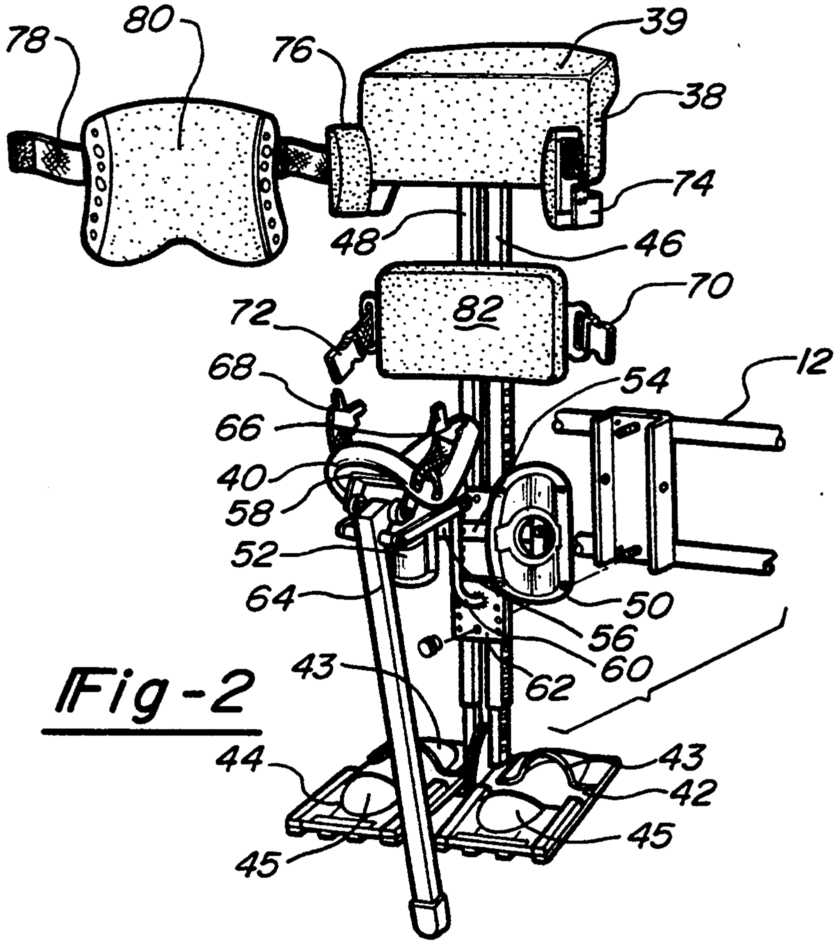
FIG. 2 is a perspective view of the prone board and its attachments according to the preferred embodiment of the present invention.

Referring to FIG. 2, the prone board 14 and all of its accessories are shown. The chest pad 38 is attached to the top of the prone board 14 and is made of vinyl-coated closed cell foam adhered onto ABS plastic and contoured to comfortably support the user's trunk. It may be provided with a chin rest extension 39 as shown for spastic users who require such support. Its width of the chest pad 38 may be varied, depending upon the needs of the particular user.

The prone board 14 actually is itself a pair of rails, illustrated as right rail 46 and left rail 48. This dual-rail construction is preferred to allow individual adjustment of the foot plates 42, 44 as may be necessary. The plates 42, 44 are telescopically slid into and out of the rails 46, 48 to accommodate users having leg length discrepancies. This will be described more fully below with respect to FIG. 3.

Still referring to FIG. 2, a pair of adjustable knee pads 50, 52 are provided. The pad 50 is attached to the rail 46 by a spring steel bracket 54, while the pad 52 is attached to the rail 48 by a spring steel bracket 56. Preferably, the pads 50, 52 are independently attached to the rails 46, 48 to allow for individual adjustment up or down, fore or aft, or in or out relative to the rails 46, 48. For example, if the user is very thin, the pads 50, 52 can be moved out, or away from the rails 46, 48. Then again, the pads can also be individually moved up or down on the rails 46, 48. This universal-type of adjustment is necessary to accommodate users of different heights and particularly to accommodate users having leg length discrepancies.

A recessed area is centrally defined in each of the pads 50, 52. This feature, along with the preferred spring steel composition of the brackets 54, 56, allow spastic activity to occur with minimal pressure being applied to the patella. The knee pads 50, 52 are preferably composed of vinyl-coated closed cell foam adhered to ABS plastic. They are contoured to comfortably hold the knees in the desired positions.

For users who require additional support, each knee pad 50, 52 may be provided with a knee pad strap (not shown) to wrap around the leg to thereby press the leg against the knee pads. The knee straps are preferably composed of one-inch webbing that is padded and anchors to one side of the knee pad. The straps wrap across the back of the knee and attach to the other side of the knee pad with hook and loop fasteners. The straps minimize the effects of hyper-extension of the knees.

In lieu of the knee pads 50, 52, a pair of knee "troughs" (not shown) may be provided for the user who cannot put pressure on his feet. The troughs are made of vinyl-coated closed cell foam that is adhered to ABS plastic and are contoured to comfortably support the lower extremities while bearing weight on the knees when prescribed. With these troughs in place, each of the user's upper and lower legs are disposed at about a ninety-degree angle relative each other, and the pressure of the user's body weight is more or less placed upon the knee.

The posterior pelvic stabilizer assembly 40 includes a stabilizer 58 that is pivotably attached to a "goose neck" 60. The "goose neck" 60 is adjustably attached to the rails 46, 48 at a plate 62. The plate 62 and its related "goose neck" 60 may be fixed at a point higher or lower along the rails 46, 48 as necessary to meet the demands of users having different heights. For example, for the taller user, the plate 62 is fixed at a higher position on the rails 46, 48. In addition, a spacing block (not shown) may be interposed between the plate 62 and the rails 46, 48 to accommodate heavier users.

The stabilizer 58 is a vinyl coated pad covering an elongated pan that is contoured to comfortably fit a user's buttocks. One end of the stabilizer 58 is more or less pointed. This end is disposed between the user's legs and acts as a leg abductor when in either vertical or horizontal positions.

The stabilizer 58 is hingedly attached to one end of the "goose neck" 60 allowing the stabilizer 58 to assume a horizontal position as illustrated in FIG. 2 for ease of mounting and dismounting of the user. In this position, a seat leg 64 extends between the underside of the stabilizer 58 and the ground. With the stabilizer unloaded, the ground end of the leg 64 clears the ground enough so that the wheelstand 10 may be moved about without dragging. With a user in the entry position or seated upon the stabilizer 58, the leg 64 contacts the ground and provides support.

The foot plates 42, 44 preferably include rubber toe sections 43 and sliding heel cups 45 mounted thereto. The heel cups 45 slide forward and lock to comfortably align the feet in the desired position and help control the degree of knee flexion. The plates 42, 44 allow for some side-to-side play, but may touch each other along their inner sides and for the most part are constructed so as to keep the feet parallel.

After the user enters the wheelstand 10 and is seated upon the stabilizer 58, he slides forward so that his feet contact the foot plates 42, 44, his knees contact the knee pads 50, 52 and his chest contacts the chest pad 38. In this more or less upright position, the stabilizer 58 tilts forward and applies forward pressure to the pelvis as illustrated in FIG. 1. A pair of pelvic straps 66, 68, preferably composed of webbed material, extend from either side of the stabilizer 58 and attach to the rails 46, 48 respectively. A pair of quick release buckles 70, 72 allow the user to easily enter and exit the wheelstand 10 with minimal difficulty.

A variety of positioning accessories are available to modify the basic wheelstand 10 as described above. The accessories are useful in achieving the goal of providing as much support for the user as is necessary to meet his special needs, but in not providing too much so as to deter independent development.

Optionally attached to the sides of the chest pad 38 are a pair of thoracic lateral pads 74, 76. The pads 74, 76 are composed of vinyl-coated closed cell foam that is adhered to ABS plastic. Each of the pads 74, 76 adjusts independently of the chest pad 38 up or down, in or out, and fore or aft to stabilize the trunk laterally and to support the user's trunk in the midline position. The pads 74, 76 with a posterior pelvic strap 78 are recommended for users having low muscle tone in the upper torso, head and neck or for users that demonstrate a tendency to lean to one side or in children with seizure disorders. The pads 74, 76 should be kept under the user's armpits for comfort.

As noted above, in many situations where the user has a spastic syndrome, the user may tilt his pelvis forward while thrusting the shoulders and head back. This is known as an anterior pelvic tilt. To minimize the extreme rearward thrusting of the shoulders and head and as a safety feature, a posterior thoracic strap 78 and a posterior thoracic panel 80 may be used. The strap 78 is preferably composed of a two-inch webbing that is anchored to one of the lateral pads. It wraps around the user's back and is attached to the other lateral pad with hook and loop fasteners. The panel 80 is a molded posterior thoraco-lumbar-sacral orthosis. It is constructed of padded polyethylene and a panel that is vacuum formed over a model. The model for the panel is contoured to conform to a particular user's back. The panel 80 is attached to the lateral pads 74, 76 by the thoracic strap 78. The panel 80 finds particular utility with users having pronounced extensor spasticity to minimize the effects of severe extensor thrusts. It is also recommended for users with low or fluctuating muscle tone in the upper torso or for children with seizure disorders.

An abdominal pad 82 is optionally provided on the rails 46, 48. The pad 82 is a contoured vinyl-coated pad that is adhered to ABS plastic. The pad 82 discourages anterior pelvic tilt when pronounced extensor thrust occurs and promotes proper alignment of the pelvis. The pad 82 is recommended for users having pronounced extensor spasticity or in users with low or fluctuating muscle tone. It is also recommended for children having seizure disorders. The pad 82 is typically used in conjunction with the posterior thoracic panel 80 to minimize thrusting movements.

Figure 3:
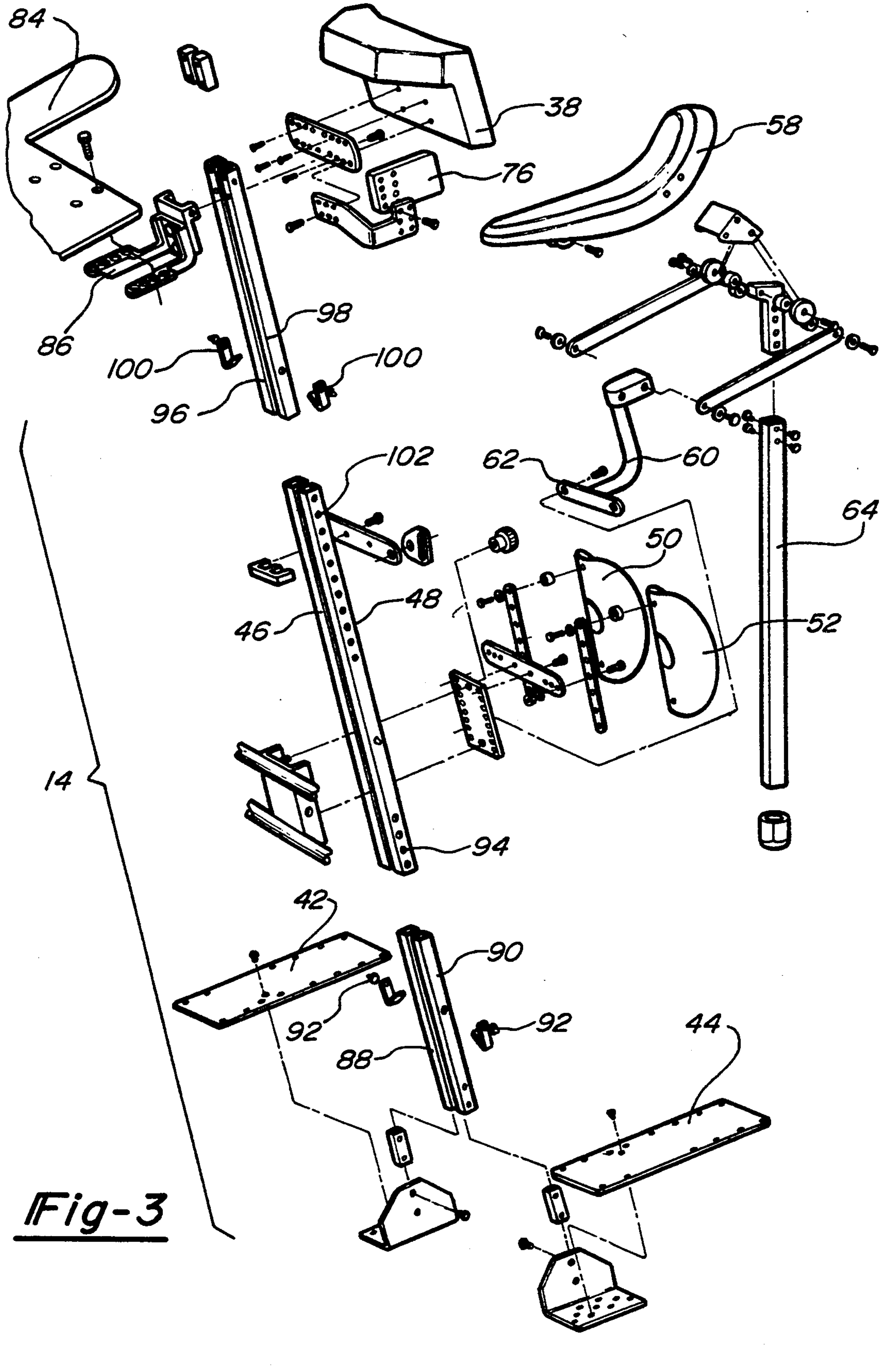
FIG. 3 is an exploded view of the prone board shown in FIG. 2.

Referring to FIG. 3, an exploded view of the prone board 14 is illustrated. Several of the components already discussed are shown, and other features are demonstrated. For example, a forearm-elbow-shoulder positioner 84 is shown. The positioner 84 is attached to the rails 46, 48. It is partially shown in FIG. 3 and is more fully shown in FIGS. 1, 4 and 5. The positioner 84 is constructed of a polycarbonate composite and is mounted to an aluminum bracket 86. The positioner 84 may be a one-pieced board or may be two independently positionable boards fitted more or less side-by-side. The bracket 86 attaches to the rails 46, 48 by quick-release push buttons (not shown). If the positioner 84 is a two-pieced board, two brackets are used, one for each half.

The positioner 84 affords the user the opportunity to support the trunk by utilizing forearm, elbow and shoulder muscles, thus strengthening the upper torso, head and neck. The positioner also affords the user a means to manipulate small objects, utilizing the hands to develop eye-hand coordination and to develop fine motor skills. The two-pieced board allows for various height settings to be achieved for properly fitting the child and affording increased development of the user.

The correct height adjustment of the positioner 84 is important. If the positioner 84 is too low relative the user's arms, the user will have to over-extend his arms. If the positioner 84 is too high, the user will be forced to pull his arms up into an unnatural position.

FIG. 3 best demonstrates the up-and-down adjustability of the foot plates 42, 44 and the chest pad 38 relative to the rails 46, 48. As to the adjustability of the foot plates 42, 44, the plate 42 is fitted to a tube 88 and the plate 44 is fitted to a tube 90. The tube 88 is telescopically inserted into the rail 46 and the tube 90 is telescopically inserted into the rail 48. Each of the tubes 88, 90 is fitted with a snap button 92 which snap into any one of several holes 94 defined in the lower end of each rail 46, 48.

As to the adjustability of the chest pad 38, the pad 38 is mounted to a pair of tubes 96, 98. The tube 96 is telescopically inserted into the rail 46 and the tube 98 is telescopically inserted into the rail 48. Each of the tubes 96, 98 is fitted with a snap button 100 which snap into any one of several holes 102 defined in the upper end of each rail 46, 48.

Figure 4:
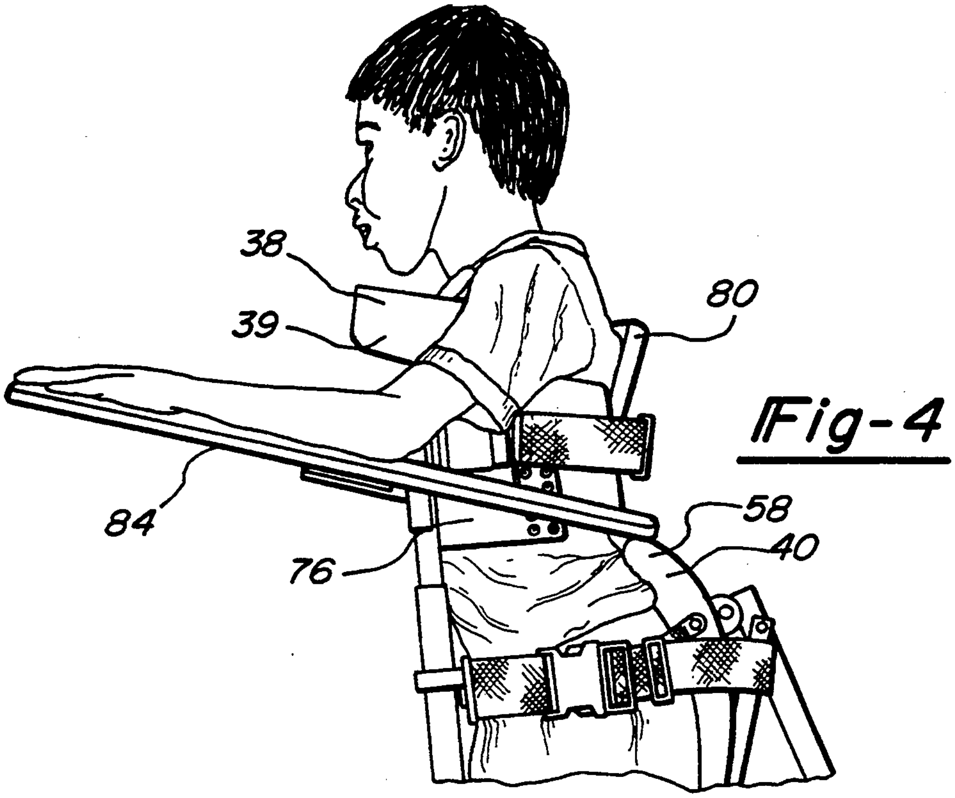
FIG. 4 is a side view showing the upper portion of the prone board and a user situated therein.
Figure 5:
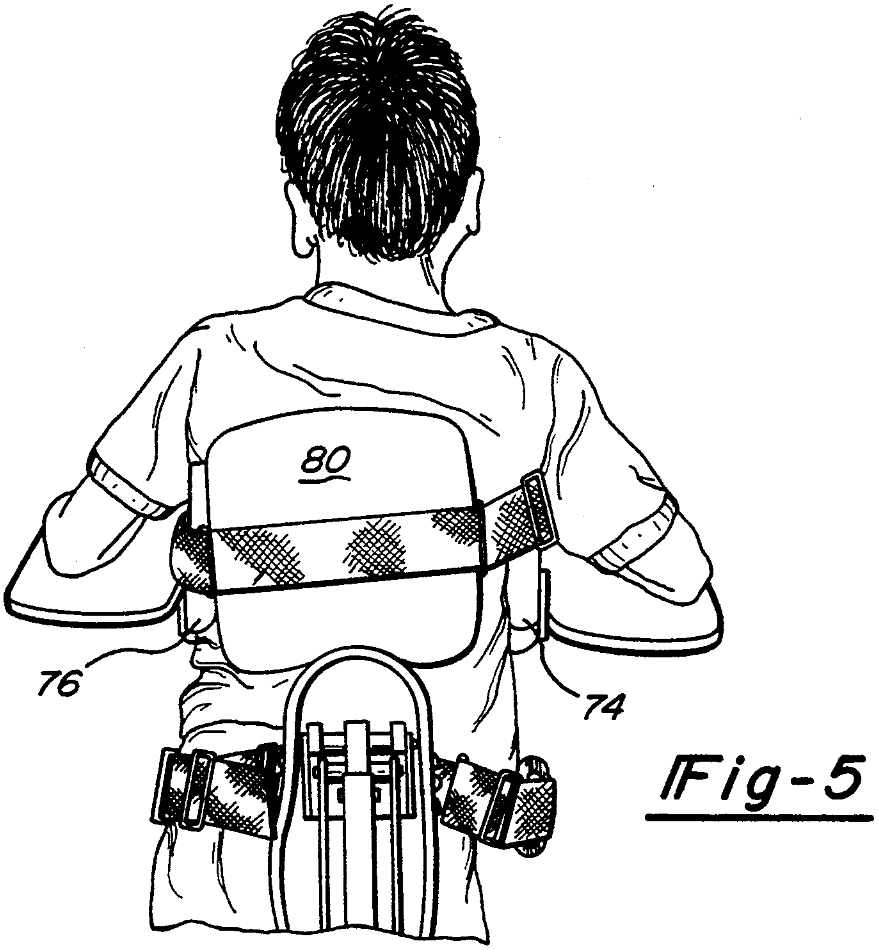
FIG. 5 is a back view of the upper portion of the prone board and the user shown in FIG. 4.

FIGS. 4 and 5 demonstrate the use of the accessories of the prone board 14 used in combination with the standard features. The particular child-user shown has a form of scoliosis that requires particular support. The user is supported under his left arm (FIG. 4) by the positioner 84. He is also supported at his back with a panel 80. The chest pad 38 includes the optional chin rest 39.

FIG. 5 demonstrates the possible placement of the lateral pads 74, 76 to assist this special user. The pad 76 is "high and in" relative to the pad 74 which is "low and out". The posterior thoracic panel 80 is contoured for the user's back and also helps maintain spinal alignment. Such placement is useful in offsetting the curved spine of the user. Not only does such placement provide the necessary support for the user, but it has also been found that such specific support has actually helped the scoliosis patient in reducing the misalignment of the spine.

Figure 6:
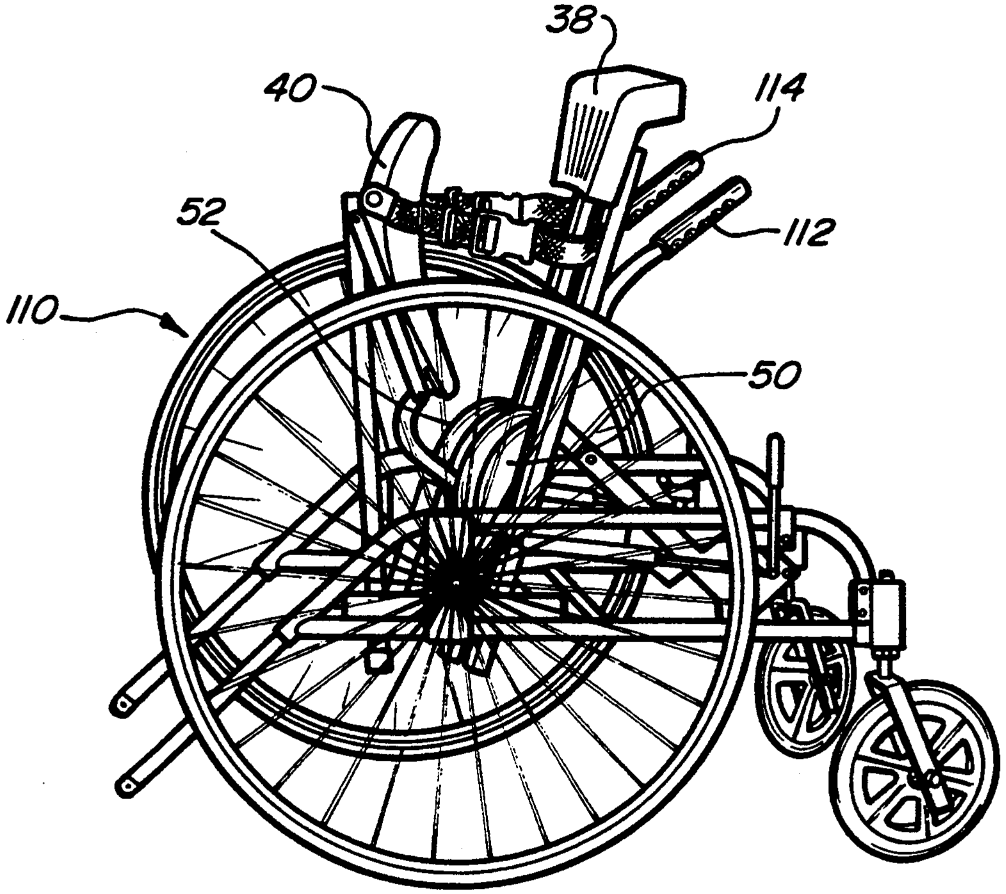
FIG. 6 is a perspective view of the wheelstand-walker, the alternate embodiment of the present invention.

FIG. 6 demonstrates an alternate embodiment of the wheelstand 10 shown and discussed with respect to FIGS. 1 through 5. The alternate embodiment shown in FIG. 6 is a wheelstand-walker, generally illustrated as 110. The wheelstand-walker 110 is substantially the same as the wheelstand 10 shown and discussed above, but does not have the foot plates. In addition, the rails 46, 48 are shortened at the ends opposite the chest pad 38 so as to allow the more able user to shuffle his feet without the possible obstruction of the rails. As may be seen, the knee pads 50, 52 are still used.

A pair of handles 112, 114 are provided for user stability. The user (not shown) may grab onto the handles or may lean on the handles for support. Alternatively, the user may hold onto the wheel rails conventionally provided on wheelchair wheels.

To use the wheelstand 10 (or the wheelstand 110 without the footplates), the following steps are followed. First, the brakes must be locked on. Second, the user "enters" the wheelstand 10 and sits upon the stabilizer 58. Third, the patellas of the user are located in the holes defined in the knee pads 50, 52. Fourth, the user raises his torso to a substantially standing position and rests it against the chest pad 38 (and the abdominal pad 82 if present) and the foot plates 42, 44. Fifth, the stabilizer 58 is brought up behind the user to press against his buttocks and, in combination with the straps 66, 68, presses the user's torso against the chest pad 38 and the knee pads 50, 52. (The chest pad 38 is adjusted up or down relative to the rails 46, 48 as is necessary to fit the individual, as are the foot plates 42, 44.)

This fitting keeps the hips from twisting and the pelvis is locked forward. Thus positioned, the user has supported alignment from the hip down, while being free to move from the hip up. Beyond this fitting, other accessories such as the lateral pads 74, 76, the thoracic strap 78, and the panel 80 are positioned for support as may be necessary on the particular individual.

The foregoing detailed description of the structure and operation of the present invention has been for clearness of understanding only and no unnecessary limitations should be understood therefrom. Some modifications will be obvious to those skilled in the art to which the invention pertains, without deviation from the spirit of the invention as defined by the scope of the appended claims.

I claim:

1. An ambulatory wheelstand for a user having a center of gravity, said wheelstand comprising:

a frame;

means for movably supporting said frame above a ground surface;

means attached to said frame for bearing a front side of the user;

means for aligning the user's legs, said means for aligning comprising a pair of knee pads, said knee pads being attached to said bearing means;

a foot plate for supporting the user's feet, said foot plate being attached to said bearing means; and means for engaging the pelvis of a user and for stabilizing the user against the bearing means;

said means for engaging comprising a stabilizing saddle and a bar, said bar being disposed between said stabilizing saddle and said bearing means, said saddle being elongated and having a first end and a second end, said saddle further having an upper user-contacting surface, said user-contacting surface being curved between said first end and said second end such that said surface is contoured to fit a user's buttocks, said first end being positioned between and abducting the user's thighs;

whereby said saddle urges the user's pelvis against said bearing means and whereby the combination of said saddle urging the user's pelvis against said bearing means, said knee pads, and said foot plate allows for even weight bearing through the lower extremity of said user on said wheelstand and stabilization of the user's pelvis while allowing unrestricted range of motion of the user's upper torso.

2. The ambulatory wheelstand of claim 1 wherein said stabilizing seat is pivotably fixed to said bar and said bar is adjustably attached to said bearing means.

3. The ambulatory wheelstand of claim 2 further including a strap interconnecting said stabilizing seat and said bearing means.

4. The ambulatory wheelstand of claim 3 further including means for adjusting said pair of knee pads on said bearing means.

5. The ambulatory wheelstand of claim 1 further including a chest support provided on said bearing means.

6. The ambulatory wheelstand of claim 5 wherein further including means for providing lateral support to the user's torso.

7. The ambulatory wheelstand of claim 6 wherein said lateral supporting means include a pair of lateral support pads, one each of said pads being attached to each side of said chest pad.

8. The ambulatory wheelstand of claim 1 further including means for providing lateral support to the user's torso.

9. The ambulatory wheelstand of claim 8 wherein said bearing means further includes a chest pad.

10. The ambulatory wheelstand of claim 9 wherein said lateral supporting means include a pair of lateral support pads attached to said chest pad.

11. The ambulatory wheelstand of claim 10 further including means for adjusting said foot plates.

12. The ambulatory wheelstand of claim 1 wherein said bearing means further includes means for supporting the abdomen of said user.

13. The ambulatory wheelstand of claim 12 wherein said abdomen supporting means comprises a plate.

14. The ambulatory wheelstand of claim 1 wherein said bearing means further includes a thoracic brace.

15. The ambulatory wheelstand for a user having a center of gravity, said wheelstand comprising:

a frame;

means for rotatably supporting said frame above a ground surface;

a prone board for supporting a user, said prone board being attached to said frame;

a posterior pelvic stabilizer for urging said user against said prone board, said posterior pelvic stabilizer being pivotably attached to said prone board;

means for aligning the user's legs;

said posterior pelvic stabilizer comprising a stabilizing saddle and a bar, said bar interconnecting said stabilizing saddle and said prone board, said bar being adjustably attached to said prone board, said saddle having an upper user-contacting surface, said surface being curved such that said surface is contoured to fit the user's posterior pelvic region, whereby said bar is adjusted on said prone board such that movement of said user's pelvis is restricted when said saddle urges the user against said prone board while allowing unrestricted range of motion of the user's upper torso.

* * * * *